United States Patent
Zeng

(10) Patent No.: US 11,803,103 B2
(45) Date of Patent: Oct. 31, 2023

(54) PHOTOGRAPHIC LAMP CHUCK COMPATIBLE WITH DIFFERENT LAMP HOLDERS

(71) Applicant: GODOX PHOTO EQUIPMENT CO., LTD., Shenzhen (CN)

(72) Inventor: Weijun Zeng, Shenzhen (CN)

(73) Assignee: Godox Photo Equipment Co., Ltd., Shenzhen (CN)

( * ) Notice: Subject to any disclaimer, the term of this patent is extended or adjusted under 35 U.S.C. 154(b) by 261 days.

(21) Appl. No.: 17/310,938

(22) PCT Filed: May 26, 2020

(86) PCT No.: PCT/CN2020/092399
§ 371 (c)(1),
(2) Date: Aug. 31, 2021

(87) PCT Pub. No.: WO2020/238916
PCT Pub. Date: Dec. 3, 2020

(65) Prior Publication Data
US 2022/0155657 A1     May 19, 2022

(30) Foreign Application Priority Data

May 28, 2019 (CN) .......................... 201920786082.5

(51) Int. Cl.
*G03B 15/04* (2021.01)
*F21V 17/02* (2006.01)
*G03B 17/56* (2021.01)
(52) U.S. Cl.
CPC .......... *G03B 15/0484* (2013.01); *F21V 17/02* (2013.01); *G03B 17/566* (2013.01)

(58) Field of Classification Search
CPC .. G03B 15/0484; G03B 15/07; G03B 17/566; G03B 2215/0592; F02V 17/02
See application file for complete search history.

(56) References Cited

U.S. PATENT DOCUMENTS 10,345,682 B1 * 7/2019 Jamison, Jr. ......... G03B 11/045
2014/0233937 A1 * 8/2014 Yokoyama ........... G03B 17/565
396/530

(Continued)

FOREIGN PATENT DOCUMENTS

CN     203422545 U     2/2014
CN     107859919 A     3/2018
(Continued)

*Primary Examiner* — Tracie Y Green
*Assistant Examiner* — Michael Chiang
(74) *Attorney, Agent, or Firm* — Rosenberg, Klein & Lee

(57) ABSTRACT

Disclosed is a photographic lamp chuck compatible with different lamp holders. The photographic lamp chuck comprises a main chuck body (100), wherein an accessory installation position is provided on the main chuck body (100), a first insertion hole (101) for accommodating a lamp holder of a first-type photographic lamp is provided in the main chuck body (100), an arc-shaped positioning face (103) and a groove body (102) are formed in an inner wall of the first insertion hole (101), a positioning inserting member (200) is movably inserted into the groove body (102), a first positioning face is arranged on the positioning inserting member (200), a second insertion hole (202) is enclosed by the first positioning face of the positioning inserting member (200) and the inner wall of the first insertion hole (101), and the second insertion hole is used for accommodating a lamp holder of a second-type photographic lamp.

20 Claims, 8 Drawing Sheets

(56) References Cited

U.S. PATENT DOCUMENTS

| | | | | |
|---|---|---|---|---|
| 2015/0077626 A1* | 3/2015 | Lique | ................ | H04N 23/51 348/373 |
| 2018/0074388 A1* | 3/2018 | Zeng | ................ | G03B 17/56 |
| 2019/0377245 A1* | 12/2019 | Boerup | ................ | G03B 17/563 |

FOREIGN PATENT DOCUMENTS

| | | |
|---|---|---|
| CN | 108036217 A | 5/2018 |
| CN | 209821570 U | 12/2019 |
| WO | 2019054938 A1 | 3/2019 |

* cited by examiner

PHOTOGRAPHIC LAMP CHUCK COMPATIBLE WITH DIFFERENT LAMP HOLDERS

CROSS-REFERENCE TO RELATED APPLICATIONS

This application is a 371 of International Application No. PCT/CN2020/092399, filed May 26, 2020, which is based upon and claims priority to Chinese Patent Application CN201920786082.5, filed May 28, 2019, the entire contents of which are incorporated herein by reference.

TECHNICAL FIELD

The present disclosure relates to photography accessories, and more particularly to a photographic lamp chuck compatible with different lamp holders.

BACKGROUND

With the continuous improvement of people's living standards, the popularity of photography in people's daily lives is also increasing, so people have put forward higher requirement for photography effects. Therefore, the applications of various photography accessories are becoming more and more extensive. In order to add various photographic accessories to the flash, some chucks for mounting the photographic accessories on the outside of the flash appear on the market today.

In tradition, the photographic lamp chuck is provided with an insertion hole, and the chuck is tightly mounted on the side wall of the flash lamp chuck through the insertion hole. However, with the development of the flash lamp, there are various shapes and structures of the traditional flash lamp holders, such as rectangular lamp holders and circular lamp holders. Since the opening structure of the insertion hole of the traditional chuck is fixed, the chuck can only be applied to flash lamp chucks that match the opening structure. As a result, the versatility of the chuck is not good, which is not conducive to market promotion.

SUMMARY

There are provided a photographic lamp chuck compatible with different lamp holders according to embodiments of the present disclosure. The technical solution is as below:

a photographic lamp chuck compatible with different lamp holders, comprising:

a main chuck body, wherein the main chuck body is provided with an accessory mounting position, and the main chuck body is provided with a first insertion hole for accommodating a first type of photographic lamp holder; wherein an inner wall of the first insertion hole is provided with an arc-shaped positioning surface and groove bodies, and a positioning inserting member is movably inserted to the groove bodies; wherein a first positioning surface is provided on the positioning inserting member, the first positioning surface of the positioning inserting member and the inner wall of the first insertion hole form a second insertion hole, and the second insertion hole is used for accommodating a second type of photographic lamp holder.

BRIEF DESCRIPTION OF THE DRAWINGS

For ease of description, the present disclosure is described in detail with the following preferred embodiments and accompanying drawings.

DETAILED DESCRIPTION

Figure 1:
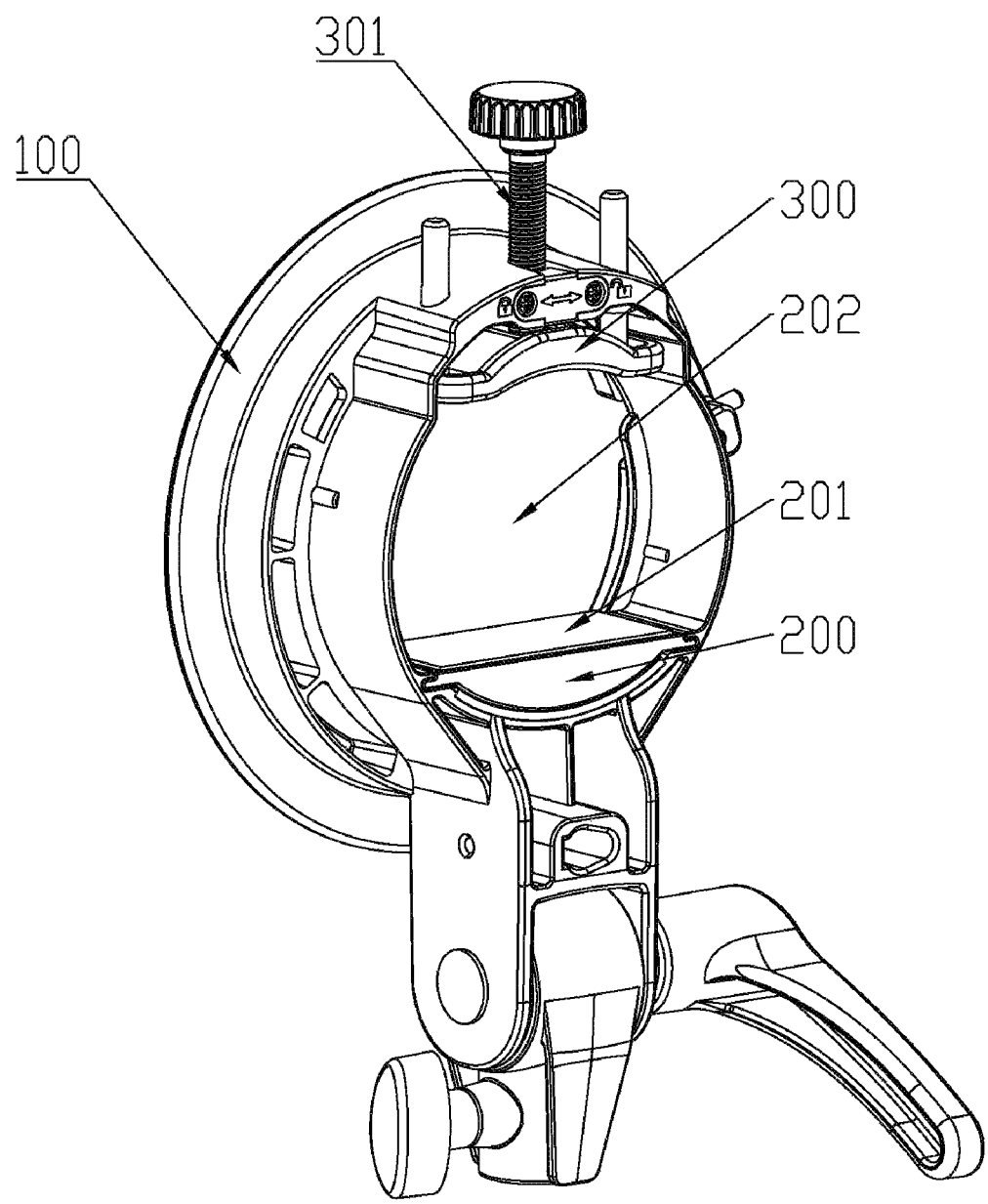
FIG. 1 is a schematic diagram of an overall structure of the present disclosure in a use state.
Figure 2:
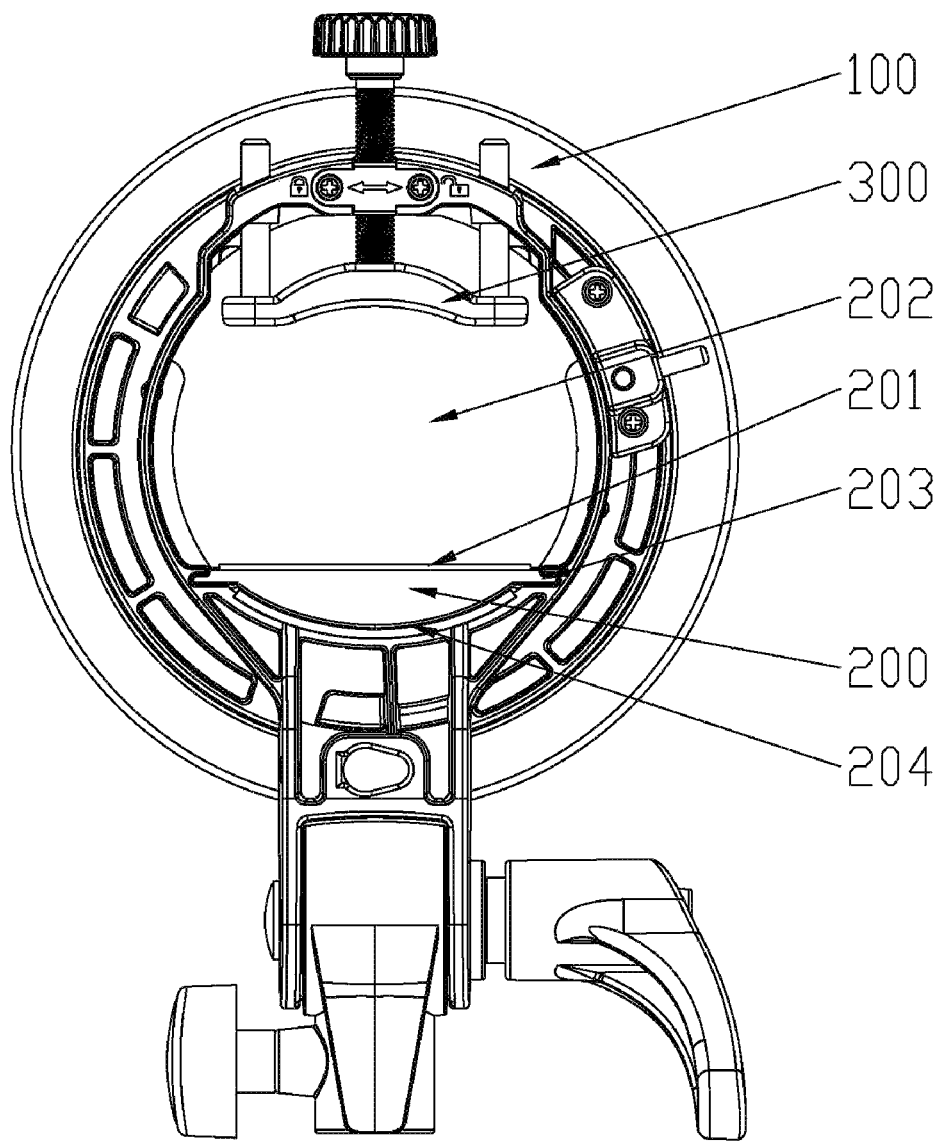
FIG. 2 is a schematic diagram of a rear view of the present disclosure in a use state.
Figure 3:
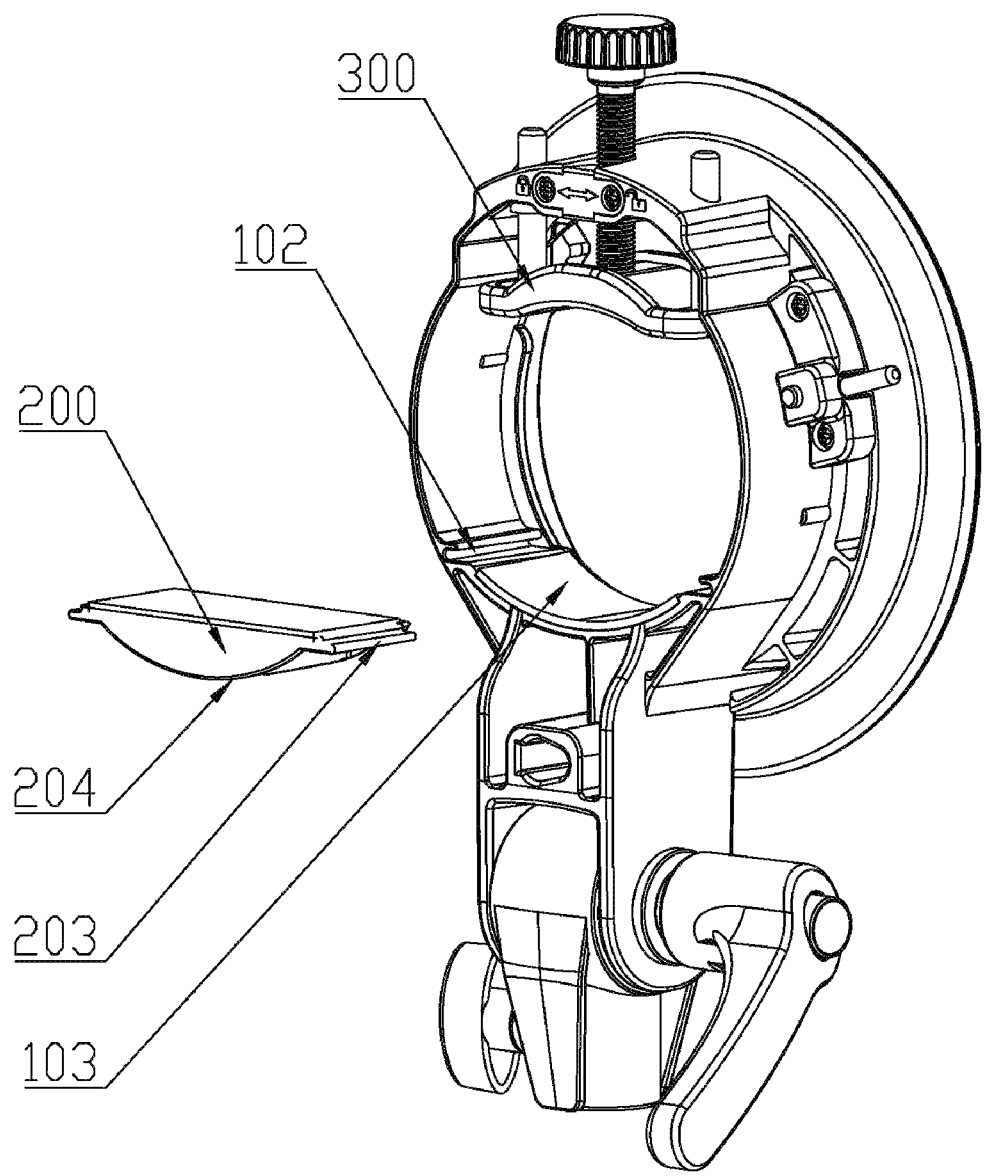
FIG. 3 is a schematic diagram of an exploded structure of an embodiment of the present disclosure.
Figure 4:
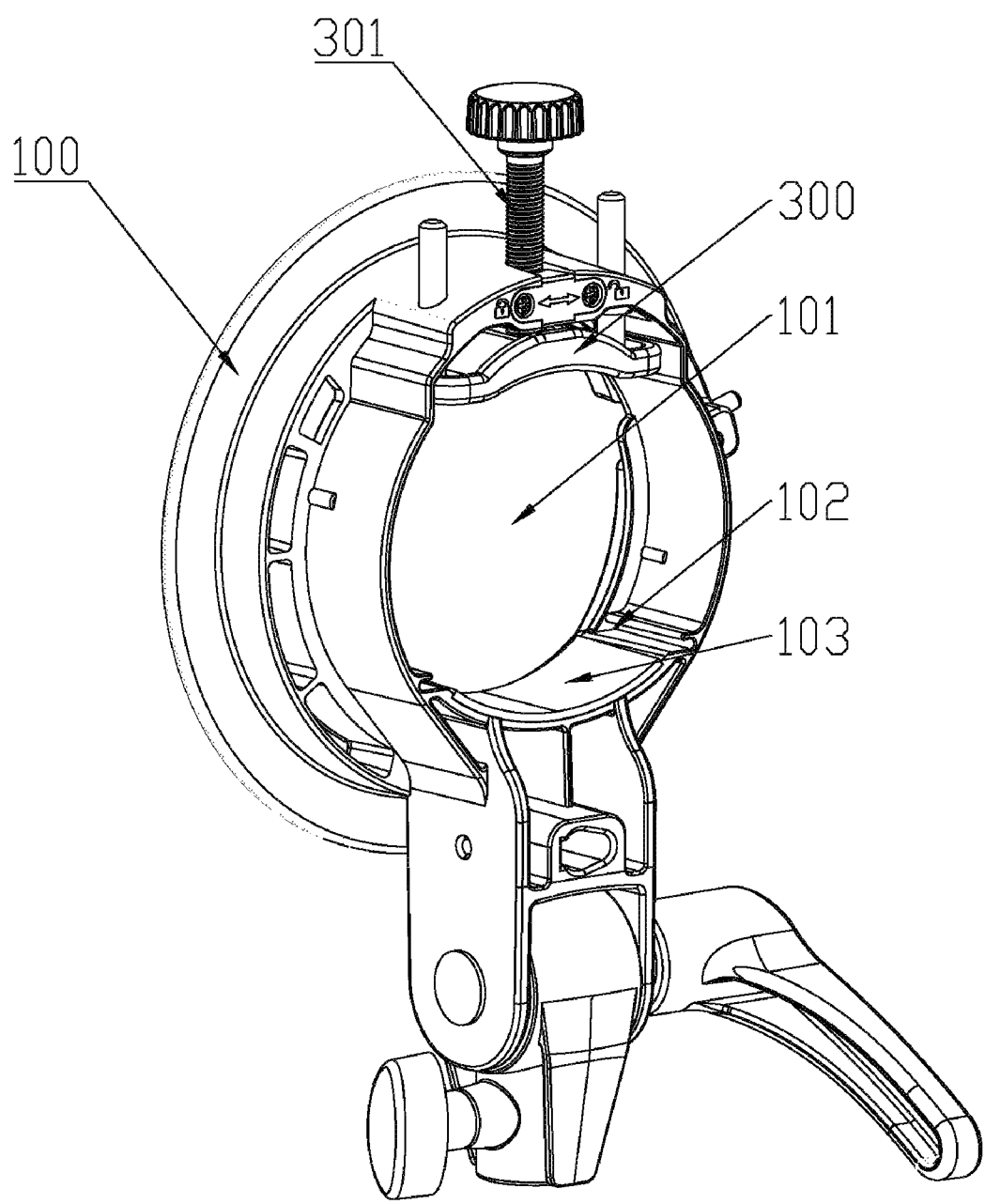
FIG. 4 is a schematic diagram of an overall structure of the present disclosure in another use state.

In order to make the object, technical solutions and advantages of the present disclosure clearer, the present disclosure is described below in detail with reference to the accompanying drawings and embodiments. It should be understood that the specific embodiments described herein are only used to explain the present disclosure, and are not used to limit the present disclosure.

In the description of the present disclosure, it should be understood that the terms used to indicate orientations and positional relationships, such as "center", "longitudinal", "transverse", "length", "width", "thickness", "upper", "lower", "front", "back", "left", "right", "vertical", "horizontal", "top", "bottom", "inner", "outer", "clockwise" and "counterclockwise", is based on the orientations or positional relationships shown in the drawings, which is only for the convenience of describing and simplifying the description of the present disclosure, rather than indicating or implying that the device or element referred to have a specific orientation, or be constructed and operated in a specific orientation, and therefore it cannot be understood as a limitation of the present disclosure. In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include one or more of the features. In the description of the present disclosure, "multiple" means two or more than two, unless otherwise specifically defined.

In the description of the present disclosure, it should be noted that, unless otherwise clearly stipulated and limited, the terms "mount", "connect", and "joint" should be understood in a broad sense, for example, it can be a fixed connection, a detachable connection, or an integral connection. Or it can be a mechanical connection or an electrical connection. Or it can be a direct connection, or an indirect connection through an intermediate medium, and it can be an internal communication between two elements or the interaction relationship between two elements. For those of ordinary skill in the art, the specific meaning of the above-mentioned terms in the present disclosure can be understood according to specific circumstances.

Referring to FIGS. 1-4, the following embodiment specifically describes a photographic lamp chuck compatible with different lamp holders of the present disclosure, including:

a main chuck body 100, which is provided with an accessory mounting position used to mount photographic accessories, such as a soft box and a reflector, and is provided with a first insertion hole 101 for accommodating a circular lamp holder of the photographic lamp. The shape of the first insertion hole 101 is circular, and the first insertion hole 101 matches an outer side of the circular lamp holder, so that the circular lamp holder is inserted into the first insertion hole 101 to mount the chuck on the circular lamp holder. An inner wall of the first insertion hole 101 is provided with an arc-shaped positioning surface 103 and groove bodies 102, and the arc-shaped positioning surface 103 is covered with elastic material. The elastic material includes silica gel and rubber. A positioning inserting member 200 is movably inserted in the groove bodies 102. The positioning inserting member 200 is provided with a platform surface 201, and the platform surface is equipped with silica gel material. The platform surface 201 of the positioning inserting member 200 and the inner wall of the first insertion hole 101 enclose a second insertion hole 202. The second insertion hole 202 is used to accommodate the second type of photographic lamp holder. Since the bottom of a rectangular lamp holder is matched with the platform surface 201 of the positioning inserting member 200, the rectangular lamp holder can be inserted into the second insertion hole 202 to mount the chuck on the rectangular lamp holder. In this embodiment, the positioning inserting member 200 is added to the circular first insertion hole 101 to form the second insertion hole 202. The first insertion hole 101 is matched with the circular lamp holder, and the second insertion hole 202 is matched with the rectangular lamp holder. The second insertion hole 202 is a part of the first insertion hole 101. In this embodiment, whether to insert the positioning inset 200 is determined according to the shape of the lamp holder, so as to adapt to different lamp holder structures. Moreover, the arc-shaped positioning surface and the platform surface are provided with silicone materials, so that the lamp holder is more firmly clamped.

In this embodiment, the positioning inserting member 200 is inserted into the first insertion hole 101 to be adapted to other types of lamp holders. Since the positioning inserting member 200 is mounted in the first insertion hole 101 in a plug-in form, the positioning inserting member 200 of different structures can be simply replaced to be adapted to different lamp holder structures.

Figure 5:
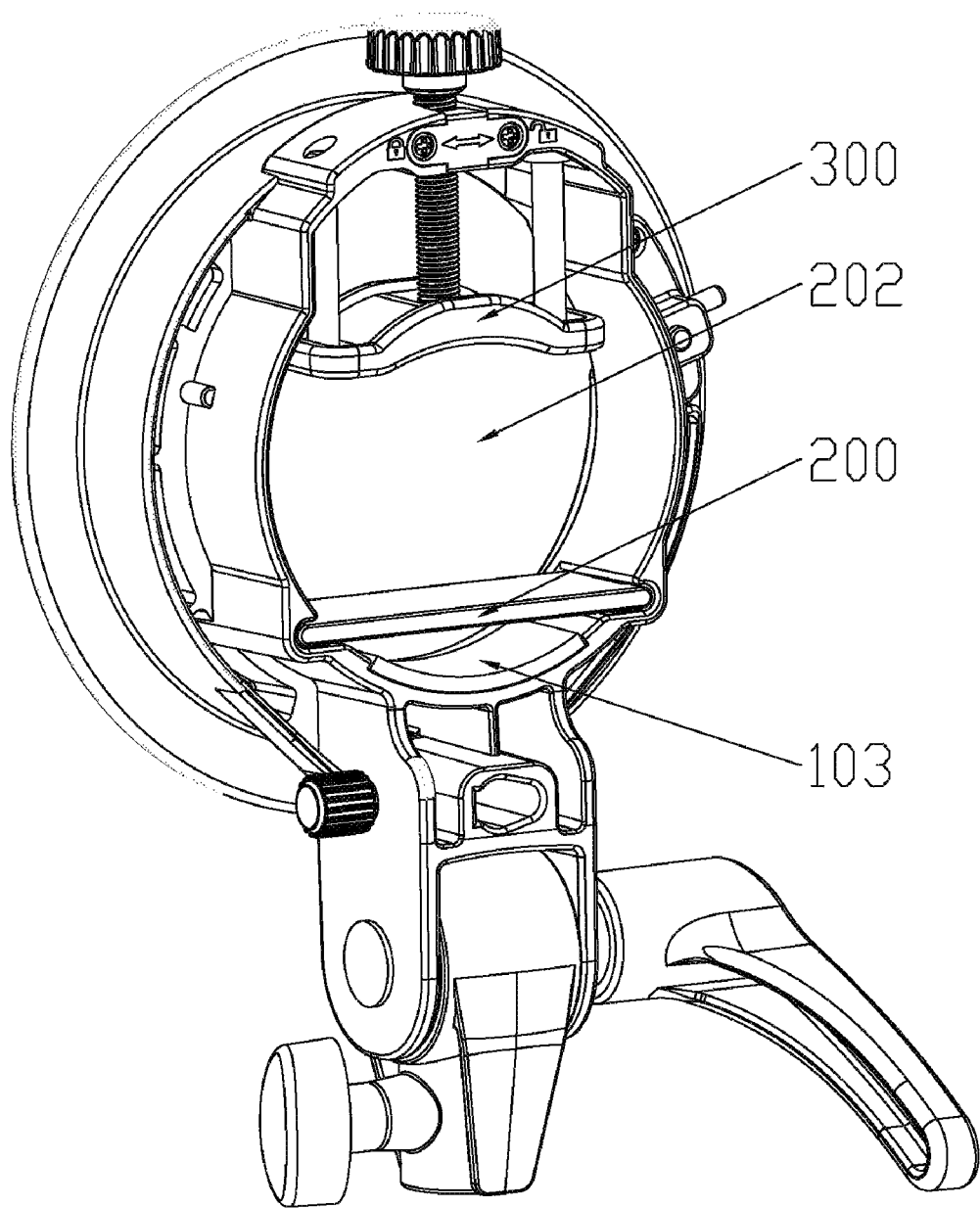
FIG. 5 is a schematic diagram of an overall structure of another embodiment of the present disclosure.

Referring to FIG. 5, the positioning inserting member 200 may be in the shape of a flat plate, and both ends of the positioning inserting member 200 are inserted into the groove bodies 102 on the inner wall of the first insertion hole 101. The structure of the positioning inserting member 200 is simple and easy to produce.

Alternatively, the platform surface 201 is arranged on one side of the positioning inserting member 200, and the other side of the positioning inserting member 200 is provided with an arc-shaped surface 204 matched with the inner wall of the first insertion hole 101. Therefore, the arc-shaped surface 204 on the positioning inserting member 200 is attached to the inner wall of the first insertion hole 101. Since the platform surface 201 on the other side is pressed against the bottom of the side surface of the lamp holder, it can effectively prevent the positioning inserting member 200 from deforming due to force.

Figure 6:
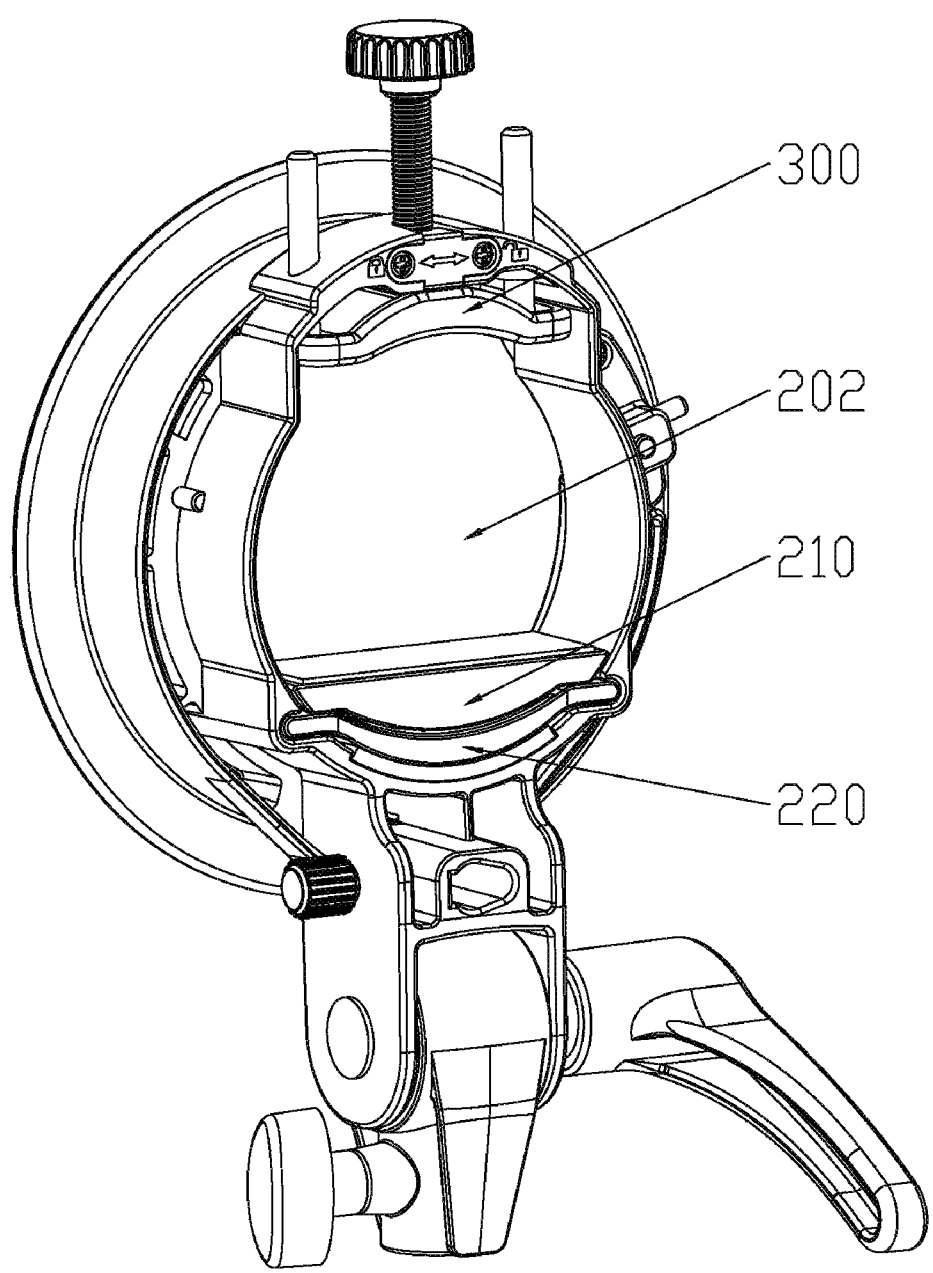
FIG. 6 is a schematic diagram of an overall structure of another embodiment of the present disclosure.
Figure 7:
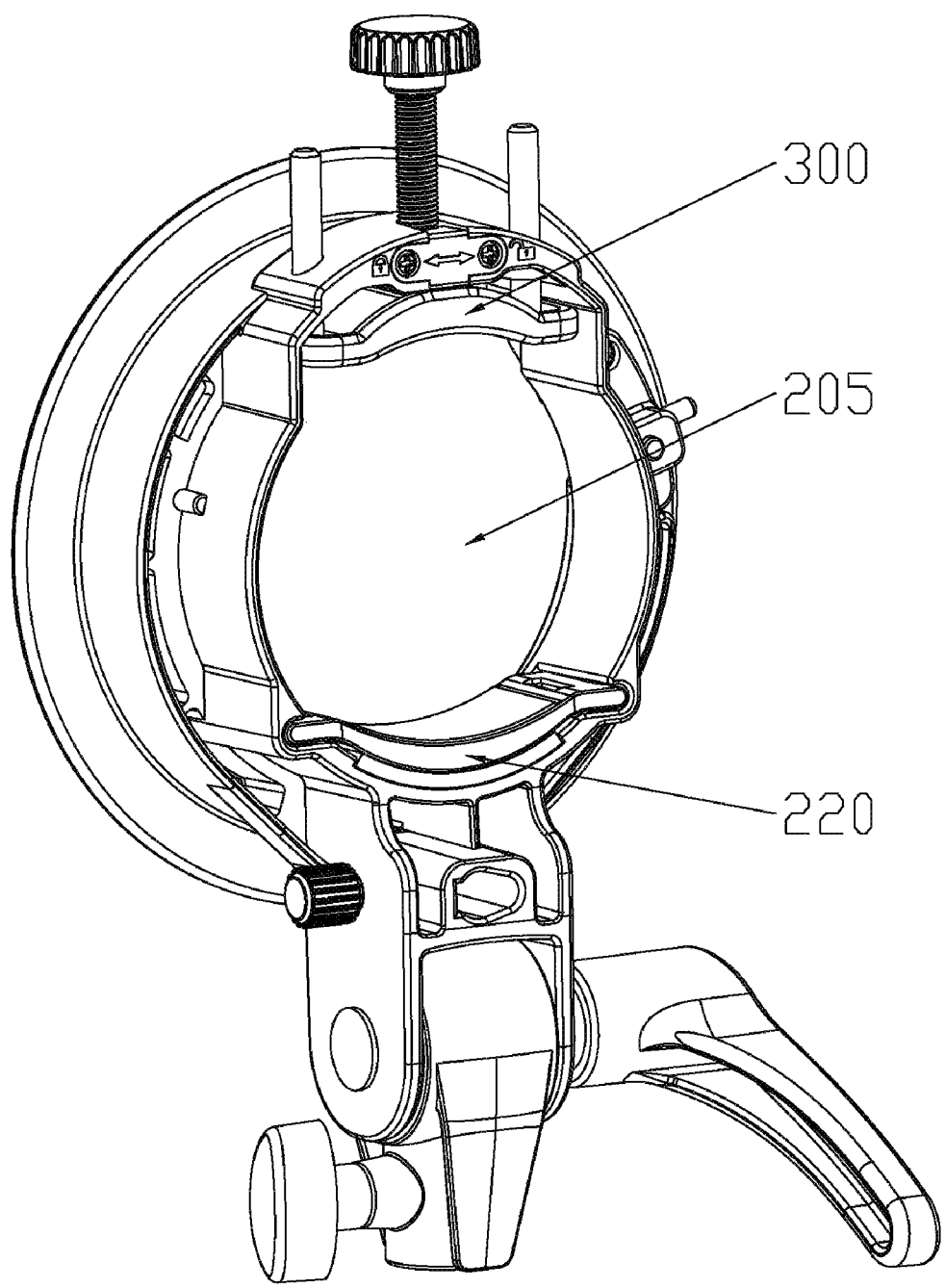
FIG. 7 is a schematic diagram of an overall structure of another embodiment of the present disclosure.
Figure 8:
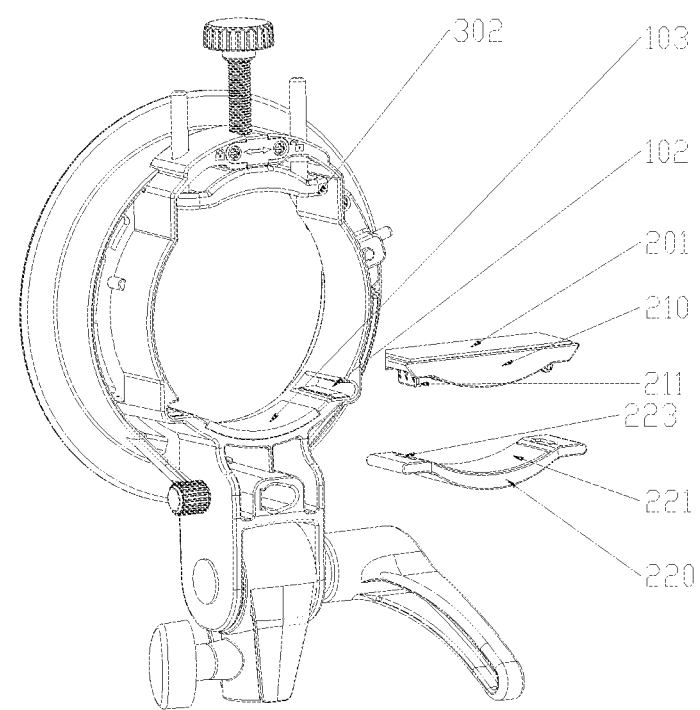
FIG. 8 is a schematic diagram of an exploded structure of another embodiment of the present disclosure.

Referring to FIGS. 6-8, the following another embodiment specifically describes a photographic lamp chuck compatible with different lamp holders of the present disclosure, including:

a main chuck body 100, which is provided with an accessory mounting position and is provided with a first insertion hole 101 for accommodating the first type of photographic lamp holder. The inner wall of the first insertion hole 101 is provided with a circular arc-shaped positioning surface 103 and groove bodies 102. A positioning inserting member 200 is movably inserted in the groove bodies 102, and the positioning inserting member is provided with a first positioning surface. The first positioning surface of the positioning inserting member and the inner wall of the first insertion hole 101 forms a second insertion hole 202, and the second insertion hole 202 is used for accommodating a second type of photographic lamp holder. The positioning inserting member 200 includes a first inserting block 210 and a second inserting block 220. The second inserting block 220 is movably mounted on the arc-shaped positioning surface 103 of the first insertion hole 101, and the second inserting block 220 is provided with a second positioning surface 221. The second positioning surface 221 and the inner wall of the first insertion hole 101 enclose a third insertion hole 205. The third insertion hole 205 is used for accommodating a third type of photographic lamp holder. The first inserting block 210 is inserted to the second inserting block 220, and the first positioning surface is arranged on the first inserting block 210.

In this embodiment, the positioning inserting member 200 includes at least two inserting blocks. When the positioning inserting member 200 is composed of two inserting blocks, it includes: a first inserting block 210 and a second inserting block 220. The second inserting block 220 is inserted and fixed in the first insertion hole 101 by ribs. At this time, the second inserting block 220 and the inner wall of the first insertion hole 101 form a third insertion hole 205 for accommodating the third type of photography the lamp holder. Latching openings 223 are provided on the second insert block 220, and the first inserting block 210 are provided with latches 211 matched with the latching openings. When the first inserting block 210 is arranged on the upper surface of the second inserting block 220, the first positioning surface on the first inserting block 210 and the inner wall of the first insertion hole 101 enclose a second insertion hole 202 for accommodating the second type of photographic lamp holder.

The shape of the first insertion hole 101 is circular, the second positioning surface 221 of the second insertion block 220 is an arc surface, and the radian of the arc surface is different from the radian of the inner wall of the first insertion hole 101. The first positioning surface in the inserting block 210 is a platform surface 201. Therefore, the chuck can be applied to circular lamp holder with different diameters or rectangular lamp holders.

In this embodiment, the number of groove bodies 102 on the inner wall of the first insertion hole 101 is at least two, and the second inserting block 220 is provided with ribs 203 that cooperate with the groove bodies 102, so that the positioning inserting member 200 is arranged in the main chuck body 100 through the cooperation of the ribs 203 and the groove bodies 102, thereby facilitating the disassembly and assembly of the positioning inserting member 200 and adapting to different lamp holders.

In this embodiment, at least one pressing member 300 is arranged in the first insertion hole 101. The pressing member 300 is used for pressing the side surface of the lamp holder, so that the lamp chuck can be firmly arranged on the chuck.

In this embodiment, the pressing member 300 is provided with a concave arc-shaped part, and both sides of the arc-shaped part is provided with a positioning plane 302. The pressing member 300 is arranged at an upper part of the first insertion hole 101, and the positioning inserting member 200 is arranged at a bottom part of the first insertion hole

101. When a rectangular lamp holder is inserted into the insertion hole, the platform surface 201 of the positioning inserting member 200 tightly presses the bottom surface of the lamp holder, and the positioning plane 302 on the pressing member 300 tightly presses the upper surface of the lamp holder, so that the rectangular lamp holder is clamped and fixed by the cooperation of the positioning inserting member 200 and the pressing member 300. When a circular lamp holder is inserted into the insertion hole, the arc-shaped surface of the inner wall of the insertion hole abuts against the bottom surface of the lamp holder, and the arc-shaped part on the pressing member 300 tightly presses the upper surface of the lamp holder, so that the circular lamp holder is clamped and fixed by the cooperation of the inner wall of the insertion hole and the pressing member 300.

When the number of the pressing members 300 is two, they can be arranged on both sides of the first insertion hole 101 in a bilaterally symmetrical manner.

In this embodiment, the pressing member 300 is movably arranged on the main chuck body 100 through an adjusting screw 301. The user can adjust the position of the pressing member 300 in the insertion hole by adjusting the screw 301 to adapt to lamp holders of different sizes.

A positioning block is movably inserted in the insertion hole of a photographic lamp chuck compatible with different lamp holders of the present disclosure, and whether to mount the positioning block is determined according to the shape and structure of the flash lamp holder, so that the chuck can be mounted on the lamp holder with different shapes and structures, which greatly enhances the scope of the applicability of the chuck, and facilitates the market promotion of the product.

In the description of this specification, the description with reference to the terms "one embodiment", "some embodiments", "exemplary embodiments", "examples", "specific examples", or "some examples" means that the specific feature, structure, material or feature described in combination with the embodiment or example is included in at least one embodiment or example of the present disclosure. In this specification, the schematic representation of the above-mentioned terms does not necessarily refer to the same embodiment or example. Moreover, the described specific features, structures, materials or characteristics can be combined in an appropriate manner in any one or more embodiments or examples.

The above are only the preferred embodiments of the present disclosure and are not intended to limit the present disclosure. Any modification, equivalent replacement and improvement made within the spirit and principle of the present disclosure shall be included within the protection scope of the present disclosure.

What is claimed is:

1. A photographic lamp chuck compatible with different lamp holders, comprising:
a main chuck body,
wherein the main chuck body is provided with an accessory mounting position, and the main chuck body is provided with a first insertion hole for accommodating a first type of photographic lamp holder; wherein an inner wall of the first insertion hole is provided with an arc-shaped positioning surface and a groove body, and a positioning inserting member is movably inserted to the a groove body; wherein a first positioning surface is provided on the positioning inserting member, the first positioning surface of the positioning inserting member and the inner wall of the first insertion hole form a second insertion hole, and the second insertion hole is used for accommodating a second type of photographic lamp holder.

2. The photographic lamp chuck compatible with different lamp holders of claim 1, wherein the positioning inserting member is comprised of two or more inserting blocks, wherein the positioning inserting member comprises a first inserting block and a second inserting block; wherein the second inserting block is movably mounted on the arc-shaped positioning surface of the first insertion hole and is provided with a second positioning surface, and the second positioning surface and an inner wall of the first insertion hole form a third insertion hole, which is used for accommodating a third type of photographic lamp holder; wherein the first inserting block is inserted to the second inserting block, and the first inserting block is provide with the first positioning surface.

3. The photographic lamp chuck compatible with different lamp holders of claim 2, wherein the number of the groove bodies on the inner wall of the first insertion hole is two or more, and the second inserting block is provided with ribs matched with the groove bodies.

4. The photographic lamp chuck compatible with different lamp holders of claim 2, wherein the second inserting block is provided with latching openings, and the first inserting block is provided with latches matched with the latching openings.

5. The photographic lamp chuck compatible with different lamp holders of claim 2, wherein a bottom surface of the first positioning inserting member is an arc-shaped surface matched with an arc surface of the second positioning inserting member.

6. The photographic lamp chuck compatible with different lamp holders of claim 2, wherein the shape of the first insertion hole is circular, the second positioning surface of the second inserting block is an arc surface, and the radian of the arc surface is different from the radian of the inner wall of the first insertion hole.

7. The photographic lamp chuck compatible with different lamp holders of claim 2, wherein the first positioning surface of the first inserting block is a platform surface.

8. The photographic lamp chuck compatible with different lamp holders of claim 1, wherein the first positioning surface is an upper surface of the positioning inserting member, and a bottom surface of the positioning inserting member is an arc-shaped surface matched with the arc-shaped positioning surface of the first insertion hole.

9. The photographic lamp chuck compatible with different lamp holders of claim 8, the arc-shaped surface of the positioning inserting member is attached to the inner wall of the first insertion hole, and the first positioning surface is pressed against the bottom of the side surface of the lamp holder.

10. The photographic lamp chuck compatible with different lamp holders of claim 1, wherein the number of the groove bodies is two, the positioning inserting member is in the shape of a flat plate, and each one of both ends of the positioning inserting member is inserted into one groove body on the inner wall of the first insertion hole.

11. The photographic lamp chuck compatible with different lamp holders of 1, wherein at least one pressing member is arranged in the first insertion hole; the at least one pressing member is provided with a concave arc-shaped part, and each of both sides of the arc-shaped part is provided with a positioning plane.

12. The photographic lamp chuck compatible with different lamp holders of claim 11, wherein the pressing member is movably arranged on the main chuck body through an adjusting screw.

13. The photographic lamp chuck compatible with different lamp holders of claim 12, wherein the pressing member is arranged at an upper part of the first insertion hole, and the positioning inserting member is arranged at a bottom part of the first insertion hole.

14. The photographic lamp chuck compatible with different lamp holders of claim 1, wherein the positioning inserting member is provided with a platform surface, which is the first positioning surface, and both the arc-shaped positioning surface and the platform surface are provided with elastic materials.

15. The photographic lamp chuck compatible with different lamp holders of claim 1, wherein the positioning inserting member has two ends, each of which is inserted into the groove body on the inner wall of the first insertion hole.

16. The photographic lamp chuck compatible with different lamp holders of claim 1, wherein the positioning inserting member comprises a first inserting block and a second inserting block; wherein the second inserting block is movably mounted on the arc-shaped positioning surface of the first insertion hole and is provided with a second positioning surface, and the second positioning surface and an inner wall of the first insertion hole form a third insertion hole, which is used for accommodating a third type of photographic lamp holder; wherein the first inserting block is inserted to the second inserting block, and the first inserting block is provide with the first positioning surface.

17. The photographic lamp chuck compatible with different lamp holders of claim 16, the bottom of the first inserting block is provided with two latches, and each latch is located on one end of the first inserting block, wherein the second inserting block is provided with two latching openings, and each latch is inserted into one of the two latching openings.

18. The photographic lamp chuck compatible with different lamp holders of claim 16, wherein the number of the groove bodies on the inner wall of the first insertion hole is two, and the second inserting block is provided with two ribs matched with the groove bodies, wherein each rib is located on one end of the second inserting block.

19. The photographic lamp chuck compatible with different lamp holders of claim 1, wherein a pressing member is movably arranged on the main chuck body through an adjusting screw, and a lamp holder is clamped and fixed by the cooperation of the inner wall of the insertion hole and the pressing member.

20. The photographic lamp chuck compatible with different lamp holders of claim 1, wherein at least two pressing members are movably arranged on the main chuck body through an adjusting screw, wherein each the pressing member is arranged on one of the two sides of the inner wall of the first insertion hole, and the pressing members arranged on the both sides of the inner wall of the first insertion hole are bilaterally symmetrical.

* * * * *